United States Patent [19]
Karasawa

[11] Patent Number: 6,091,740
[45] Date of Patent: Jul. 18, 2000

[54] BANDWIDTH MANAGEMENT METHOD AND CIRCUIT, COMMUNICATION APPARATUS, COMMUNICATION SYSTEM, AND DUAL-QUEUE NETWORK UNIT

[75] Inventor: Satoru Karasawa, Tokyo, Japan

[73] Assignee: Oki Electric Industry Co., Ltd., Tokyo, Japan

[21] Appl. No.: 09/031,792

[22] Filed: Feb. 27, 1998

[30] Foreign Application Priority Data

Jun. 20, 1997 [JP] Japan ................................. 9-163893

[51] Int. Cl.[7] ............................................ H04J 3/02
[52] U.S. Cl. ..................... 370/458; 370/456; 370/442; 370/461
[58] Field of Search ................................. 370/456, 458, 370/442, 461, 472, 447, 462

[56] References Cited

U.S. PATENT DOCUMENTS

| | | | |
|---|---|---|---|
| 4,726,040 | 2/1988 | Acampora | 370/442 |
| 4,757,498 | 7/1988 | Murray | 370/458 |
| 5,051,989 | 9/1991 | Negishi | 370/442 |
| 5,398,129 | 3/1995 | Reimann | 370/442 |
| 5,889,767 | 3/1999 | Kimura | 370/472 |

OTHER PUBLICATIONS

Takigawa et al., "ATM based Passive Double Star system offering B–ISDN, N–ISDN, and POTS," Globcom '93, IEEE, 1993, pp. 14–18.

Nakashima et al., "Time Slot Assignment Method for ATM–PDS–System," Proceedings of 1993 Autumn Meeting of the Institute of Electronics, Information and Communication Engineers, p. 3–307.

*Primary Examiner*—Salvatore Cangialosi
*Attorney, Agent, or Firm*—Rabin & Champagne, P.C.

[57] ABSTRACT

A bandwidth management circuit in a communication system assigns time slots to constant-bit-rate signal sources and burst signal sources sharing a common communication channel. When a burst signal source has information to transmit, it is assigned time slots in fixed-length bursts of consecutive or nearly consecutive time slots. The bandwidth management circuit has a burst scheduler that requests these time slots, generating consecutive requests during each burst. Each burst is followed by an interval in which no requests are generated. The bandwidth management circuit can be used in communication equipment connected to several network units in a star topology. Each network has a constant-bit-rate queue and/or a burst queue storing information to be transmitted to the communication equipment.

21 Claims, 5 Drawing Sheets

BANDWIDTH MANAGEMENT METHOD AND CIRCUIT, COMMUNICATION APPARATUS, COMMUNICATION SYSTEM, AND DUAL-QUEUE NETWORK UNIT

BACKGROUND OF THE INVENTION

The present invention relates to a bandwidth management method and circuit for assigning time slots to signal sources sharing a common channel, to a communication apparatus and communication system employing this bandwidth management method and circuit, and to a dual-queue network unit used in the communication system.

An example of a communication system in which the present invention is useful is a passive double star (PDS) system employing the asynchronous transfer mode (ATM). The PDS topology provides an efficient way to use optical fibers to link multiple optical network units, located on user premises, to a subscriber line terminal in a telephone switching office. ATM provides for efficient transmission of mixed communication traffic, including digital voice, video, and data signals.

A problem in a fiber-optic ATM-PDS system concerns the assignment of time slots to different signal sources. To avoid collisions, the optical network units transmit to the subscriber line terminal only when directed to do so by the subscriber line terminal, in time slots assigned by a bandwidth management circuit in the subscriber line terminal. A conventional bandwidth management circuit assigns time slots to each optical network unit at substantially regular intervals, the length of the intervals being inversely proportional to the bandwidth allocated to the optical network unit.

This arrangement works well for signals such as video signals that have a substantially constant bit rate, but is far less satisfactory for signal traffic generated by sources such as personal computers, that tend to transmit data in variable bursts. If bandwidth is allocated according to the average bit rate of a burst signal source, then during the long periods while the signal source is not transmitting, the allocated bandwidth will be unused, but when a burst does occur, the bandwidth will be inadequate and much data will have to be queued at the optical network unit. The queuing causes unwanted transmission delays, and the optical network unit needs a large buffer memory to store the queue. If bandwidth is assigned according to the peak bit rate of a burst signal source, the buffering requirements and delays can be reduced, but the signal source will have to be assigned a large fraction of the system's bandwidth resources, limiting the number of signal sources that can be served.

SUMMARY OF THE INVENTION

It is accordingly an object of the present invention to manage bandwidth efficiently in a system having both constant-bit-rate signal sources and burst signal sources, by assigning time slots to the signal sources efficiently.

The invented method of assigning time slots comprises the steps of:

generating first request signals for each constant-bit-rate signal source at intervals determined according to a service parameter of the constant-bit-rate signal source;

generating second request signals in a burst mode for each burst signal source, by generating a consecutive series of a certain number of second request signals, followed by a certain interval before another consecutive series of second request signals is generated for the same burst signal source; and assigning time slots according to the first and second request signals, with priority preferably given to the first request signals.

The invented method preferably also comprises the steps of:

generating second request signals for each burst signal source in a monitoring mode, in which the second request signals are generated one by one at certain intervals;

switching to the monitoring mode, for a burst signal source, when the burst signal source has no information to send in a time slot assigned in the burst mode; and switching to the burst mode, for a burst signal source, when the burst signal source sends information in a time slot assigned in the monitoring mode.

The invented bandwidth management circuit comprises at least one constant-bit-rate scheduler generating first request signals as described above for a corresponding constant-bit-rate signal source, at least one burst scheduler generating second request signals as described above for a corresponding burst signal source, an arbiter that assigns time slots according to the first and second request signals, and a decoder that notifies each constant-bit-rate scheduler and burst scheduler when a time slot is assigned to the corresponding signal source. Each burst scheduler comprises, for example, a first counter that determines the lengths of intervals between the second request signals, by counting time slots, a second counter that counts time slots assigned to the corresponding burst signal source, for control of the initialization of the first counter, and a third counter that generates priority values used to resolve conflicts among competing second request signals.

The invented communication apparatus comprises the invented bandwidth management circuit, which assigns time slots on a shared communication channel through which the communication apparatus communicates with the signal sources. The communication apparatus transmits information to the signal sources indicating the signal source to which each time slot is assigned, and receives information transmitted by the signal sources in the assigned time slots.

The invented communication system comprises the invented communication apparatus, a star coupler coupled to the communication apparatus by the shared communication channel, and a plurality of network units independently coupled to the star coupler. Each network unit has a constant-bit-rate signal queue and/or a burst queue for storing information to be transmitted to the communication apparatus. A network unit having a constant-bit-rate queue is treated as a constant-bit-rate signal source; a network unit having a burst queue is treated as a burst signal source; and a network unit having both types of queues is treated as both a constant-bit-rate signal source and a burst signal source.

The invented dual-queue network unit has a constant-bit-rate queue, a burst queue, a detector receiving information from a communication apparatus, and a selector for selecting information from the constant-bit-rate queue or burst queue, as designated by the received information, when the received information indicates that the dual-queue network has permission to transmit information in a time slot.

DETAILED DESCRIPTION OF THE INVENTION

A communication system, communication apparatus, dual-queue network unit, and bandwidth management circuit embodying the present invention will be described with reference to the attached illustrative drawings.

Figure 1:
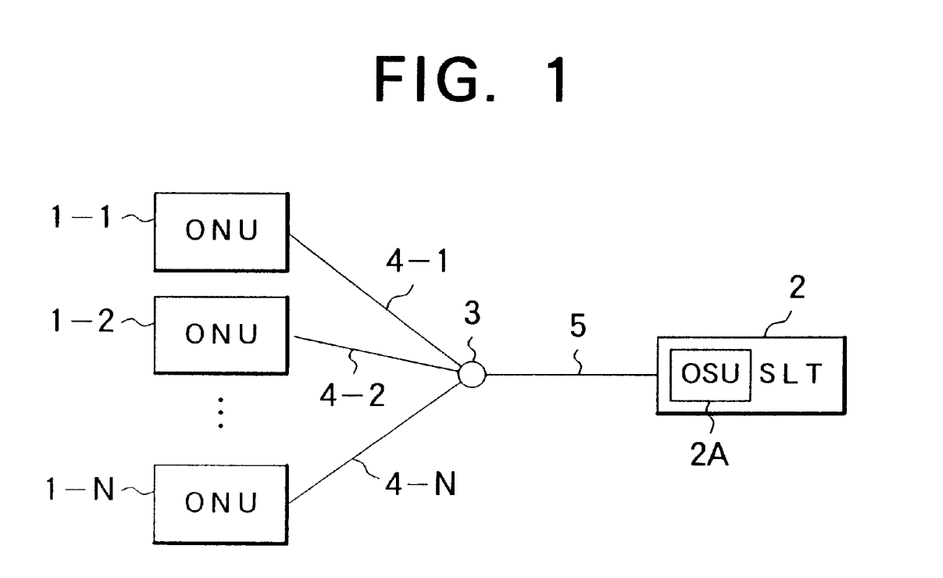
FIG. 1 is a network diagram illustrating the passive double star topology.

Referring to FIG. 1, the communication system comprises N optical network units (ONUs) 1-1 to 1-N coupled to a subscriber line terminal (SLT) 2 through a star coupler 3, where N is an integer greater than one. The individual optical network units 1-1 to 1-N are coupled to the star coupler 3 through corresponding optical fibers 4-1 to 4-N; the star coupler 3 is coupled through a single shared optical fiber 5 to the subscriber line terminal 2. The optical network units 1-1 to 1-N are disposed on subscriber premises and are coupled through a user network interface (UNI) to devices such as telephone sets, computers, and video cameras (not visible). The optical network units 1-1 to 1-N have electro-optical and opto-electrical converters for converting between the electrical signals sent and received by these devices and the optical signals transmitted on the optical fibers 4-1 to 4-N.

The subscriber line terminal 2, which is disposed in a telephone switching office, has a plurality of optical subscriber units 2A, of which only one in shown in the drawing. Each optical subscriber unit (OSU) 2A is connected to a single star coupler 3, and provides interface functions, including electro-optical and opto-electrical conversion, between the telephone switching system and the optical network units coupled to the star coupler 3. The network configuration is described as a double star because, when a connection is made from one signal source to another signal source, possibly served by a different telephone switching office, the connection passes through a star coupler at each end.

The star coupler 3 passively combines signals, referred to below as upstream signals, from the optical network units 1-1 to 1-N into a single upstream signal sent to the subscriber line terminal 2, and passively branches signals, referred to below as downstream signals, from the subscriber line terminal 2 to all of the optical network units 1-1 to 1-N. To prevent mutual interference, the upstream signals are transmitted at a different optical wavelength from the downstream signals. The combined upstream cell rate on the shared optical fiber 5 is the same as the downstream cell rate.

The upstream and downstream signals are sixty-byte packets referred to as ATM-PDS cells, each comprising a seven-byte ATM-PDS header and a fifty-three-byte ATM cell. The ATM cell contains the payload data, and also contains ATM header information such as a virtual channel identifier (VCI) and virtual path identifier (VPI) identifying the type and destination of the cell.

The ATM-PDS header of an upstream cell comprises a guard time interval, a preamble used for bit synchronization, a delimiter used for byte synchronization, and other information identifying the type of cell. The purpose of the guard time interval is to leave a margin of time between adjacent ATM-PDS cells in the cellstream.

The ATM-PDS header of a downstream cell comprises, among other items, two identical burst signal control (BSC) bytes. These BSC bytes do not pertain to the downstream cell itself, but give a specified optical network unit permission to transmit one upstream cell of a specified type. The term 'burst signal' is here used as a synonym for cell, and does not refer to burst traffic as opposed to constant-bit-rate traffic.

Each BSC byte comprises, for example, four bits identifying one of the optical network units 1-1 to 1-N, a fifth bit designating either a constant-bit-rate (CBR) or burst cell, and three check bits. The optical network unit designated by the first four bits is permitted to transmit one cell of the type designated by the fifth bit. One BSC byte value is reserved as a code inhibiting all optical network units 1-1 to 1-N from transmitting cells. This structure enables a BSC byte to distinguish among up to fifteen optical network units 1-1 to 1-N coupled to the star coupler 3.

Figure 2:
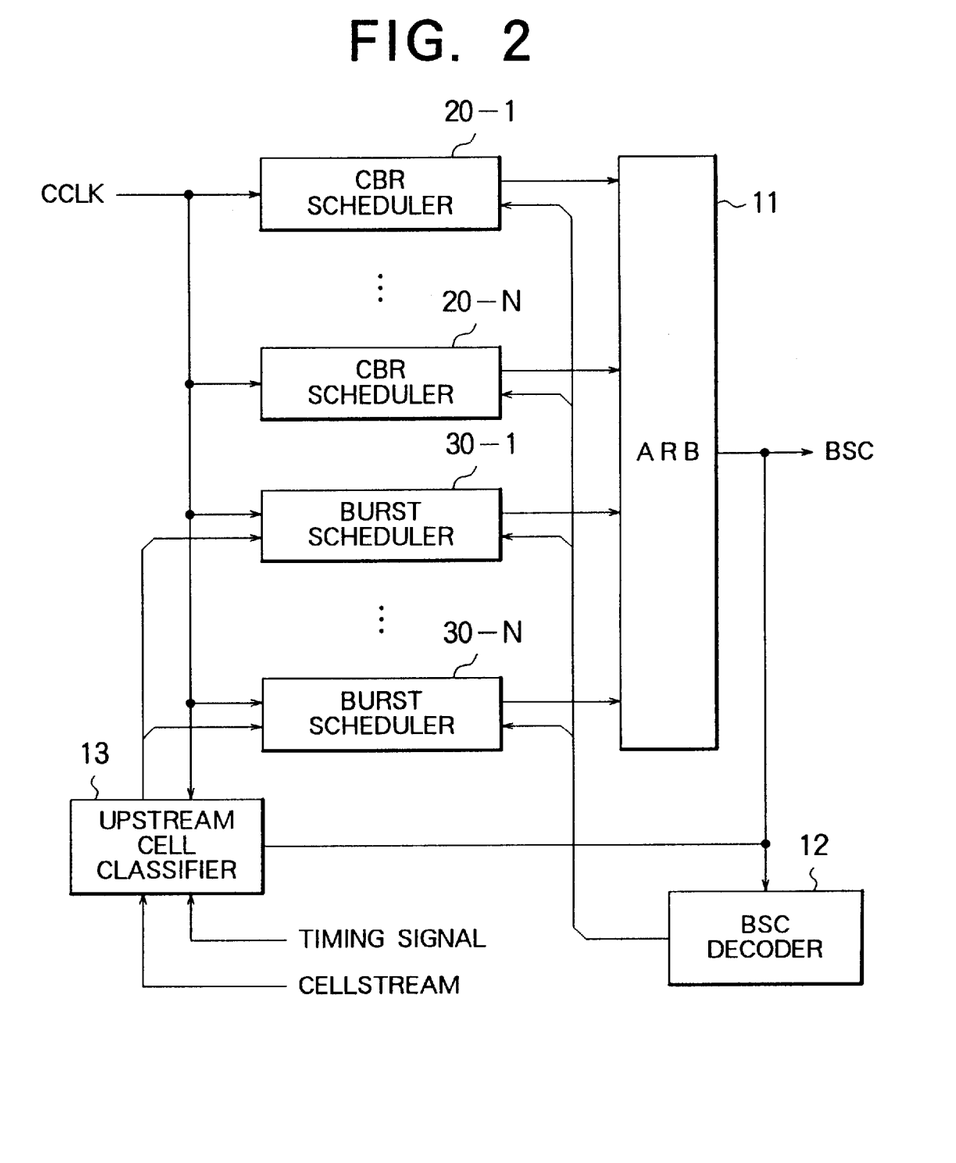
FIG. 2 is a block diagram of a bandwidth management circuit in the subscriber line terminal in FIG. 1.

Referring to FIG. 2, the optical subscriber unit 2A has a bandwidth management circuit comprising an arbiter 11, a BSC decoder 12, an upstream cell classifier 13, N constant-bit-rate (CBR) schedulers 20-1 to 20-N, and N burst schedulers 30-1 to 30-N. The bandwidth management circuit operates in synchronization with a cell clock signal CCLK, which controls downstream time slots. Each CCLK cycle corresponds to one time slot, in which one downstream cell is transmitted.

The CBR schedulers 20-1 to 20-N and burst schedulers 30-1 to 30-N calculate waiting times as described below, and send these waiting times as request signals to the arbiter 11. A non-zero waiting time is a request for a time slot: a request for the arbiter 11 to output a BSC designating the corresponding optical network unit and type of cell. Increasing waiting-time values denote increasingly urgent requests. A zero waiting time denotes the absence of a request. Each of the CBR schedulers 20-1 to 20-N and burst schedulers 30-1 to 30-N outputs one waiting-time value per time slot. A non-zero waiting-time value output by one of the CBR schedulers 20-1 to 20-N will be referred to below as a CBR request signal or CBR request; a non-zero waiting-time value output by one of the burst schedulers 30-1 to 30-N will be referred to as a burst request signal or burst request.

Upon receiving a request from just one of the CBR and burst schedulers 20-1 to 20-N and 30-1 to 30-N, the arbiter 11 outputs the requested BSC value, which is attached to the next downstream cell. When two or more simultaneous requests are received, if there is at least one CBR request, the arbiter 11 gives priority to the CBR request with the highest waiting-time value. If there are no CBR requests, priority is given to the burst request with the highest waiting-time value.

The BSC decoder 12 decodes the BSC values output by the arbiter 11, and signals the corresponding one of the CBR schedulers 20-1 to 20-N or burst schedulers 30-1 to 30-N. The BSC values output by the BSC decoder 12 are also sent to the upstream cell classifier 13.

Figure 3:
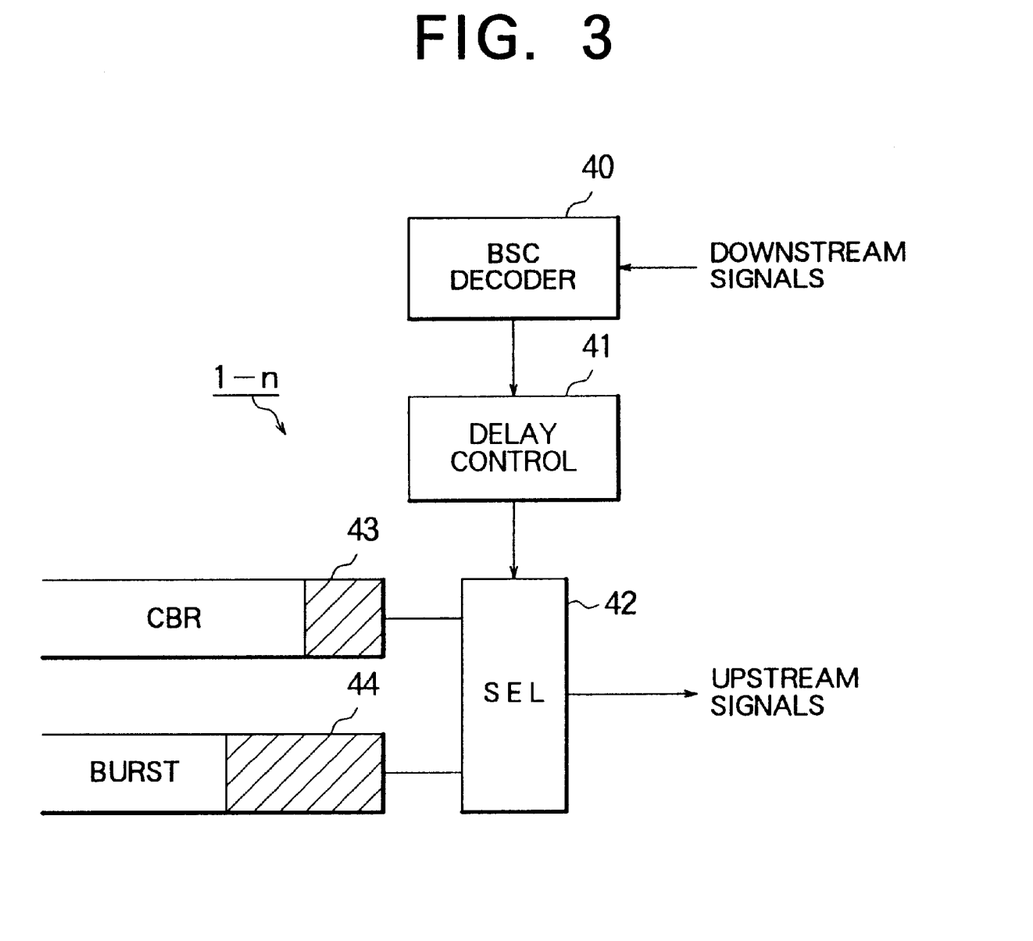
FIG. 3 is a block diagram of one of the dual-queue optical network units in FIG. 1.

Operating in synchronization with a timing signal that identifies upstream time slots, the upstream cell classifier 13 examines the ATM headers of upstream cells to determine whether the cells are idle. Using the BSC values received from the arbiter 11, the upstream cell classifier 13 also identifies the source of each cell, the source being either the CBR queue 43 or burst queue 44 in a particular optical network unit 1-n ($1 \leq n \leq N$). When a cell is received from the burst queue 44 of optical network unit 1-n, the upstream cell classifier 13 informs the corresponding burst scheduler 30-n whether cell is an idle cell or a burst cell. A burst cell is a cell that was actually taken from the burst queue 44. An Idle cell is a cell with no payload data, that was transmitted because the burst queue 44 was empty.

Referring to FIG. 3, each of the optical network units 1-1 to 1-N is a dual-queue network unit comprising a BSC detector 40, a delay control unit 41, a selector 42, a CBR queue 43, and a burst queue 44. Each optical network unit also has a facility (not shown) that examines submitted ATM cells, determines from the VCI and VPI information in the cell whether the cell is a CBR cell or a burst cell, and places the cell in the appropriate queue 43 or 44. Both queues 43 and 44 are first-in-first-out (FIFO) queues.

Downstream ATM-PDS cells arriving at an optical network unit 1-n ($1 \leq n \leq N$) are examined by the BSC detector 40, which determines whether the BSC information gives that particular optical network unit 1-n permission to transmit a cell. If so, the BSC detector 40 passes the BSC byte value to the delay control unit 41, which passes the BSC byte on to the selector 42 with a certain delay. This delay can be fine-tuned to avoid collisions between upstream cells at the star coupler 3.

Upon receiving a BSC byte giving permission to send a CBR cell, the selector 42 selects the oldest ATM cell in the CBR queue 43, adds ATM-PDS header information, and outputs the resulting ATM-PDS cell. If the BSC gives permission to sent a burst cell, the selector 42 selects the oldest ATM cell in the burst queue 44, adds ATM-PDS header information, and outputs the resulting ATM-PDS cell. If no ATM cell is present in the designated queue 43 or 44, the selector 42 assembles and outputs an idle ATM-PDS cell.

The network unit configuration allows the bandwidth management circuit to regard each CBR queue 43 in each optical network unit 1-n ($1 \leq n \leq N$) as a single CBR signal source, and each burst queue 44 in each network unit 1-n ($1 \leq n \leq N$) as a single burst signal source. Each dual-queue optical network unit is accordingly treated as both a CBR signal source and a burst signal source. The bandwidth management circuit does not have to distinguish between the individual devices, such as telephone sets and computers, connected to the optical network units.

Next, the internal structure of the CBR schedulers 20-1 to 20-N and burst schedulers 30-1 to 30-N in the bandwidth management circuit will be described.

Figure 4:
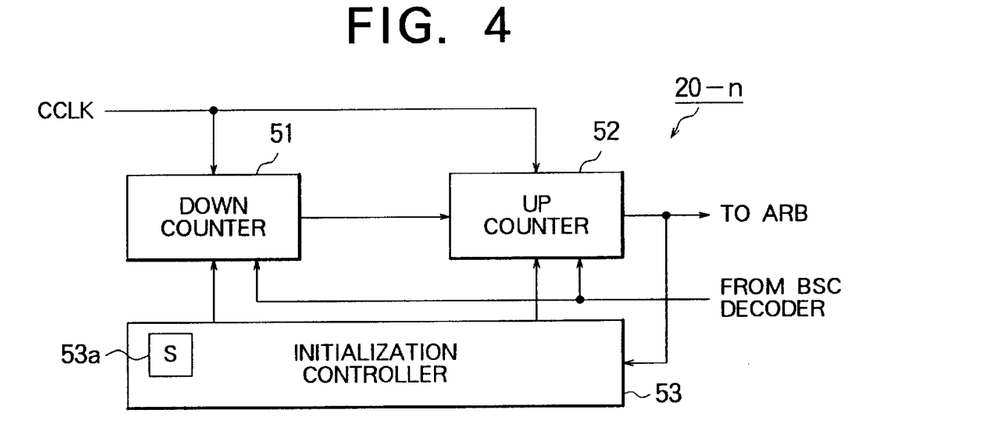
FIG. 4 is a block diagram of one of the constant-bit-rate schedulers in FIG. 2.

Referring to FIG. 4, each of the CBR schedulers 20-1 to 20-N comprises a down-counter 51, an up-counter 52, and a initialization controller 53. Both counters 51 and 52 output count values, which are incremented or decremented once per cycle of the cell clock CCLK. The counters 51 and 52 accordingly count time slots.

When the down-counter 51 in CBR scheduler 20-n receives a signal from the BSC decoder 12, indicating that the arbiter 11 has output BSC information permitting optical network unit 1-n to transmit a CBR cell, the down-counter 51 loads a first value from the initialization controller 53, counts down from the first value to zero in synchronization with the cell clock CCLK, then stops counting and continues to output a zero value until the next signal from the BSC decoder 12.

When the up-counter 52 in CBR scheduler 20-n receives the same signal from the BSC decoder 12, the up-counter 52 loads a second value from the initialization controller 53. During the interval while the output of the down-counter 51 is zero, the up-counter 52 counts up from the second value, in synchronization with the cell clock CCLK. The count value output by the up-counter 52 is the waiting-time signal sent to the arbiter 11, and is also sent to the initialization controller 53.

The initialization controller 53 has an internal register 53A storing a cell spacing value S determined according to a service parameter in a CBR service contract covering the CBR connections currently handled by optical network unit 1-n. The above-mentioned first value, loaded into the down-counter 51, and second value, loaded into the up-counter 52, are determined from the value S stored in register 53A and the value output by the up-counter 52.

If the waiting-time value output by the up-counter 52 is less than the cell spacing value stored in register 53A, the initialization controller 53 loads the absolute value of the difference between the cell spacing value and the waiting-time value into the down-counter 51, and loads zero into the up-counter 52. If the waiting-time value is equal to or greater than the cell spacing value, the initialization controller 53 loads their absolute difference into the up-counter 52, and loads zero into the down-counter 51. The values determined in this way by the initialization controller 53 are output continuously to the down-counter 51 and up-counter 52, but are loaded only when the necessary signal is furnished by the BSC decoder 12.

Figure 5:
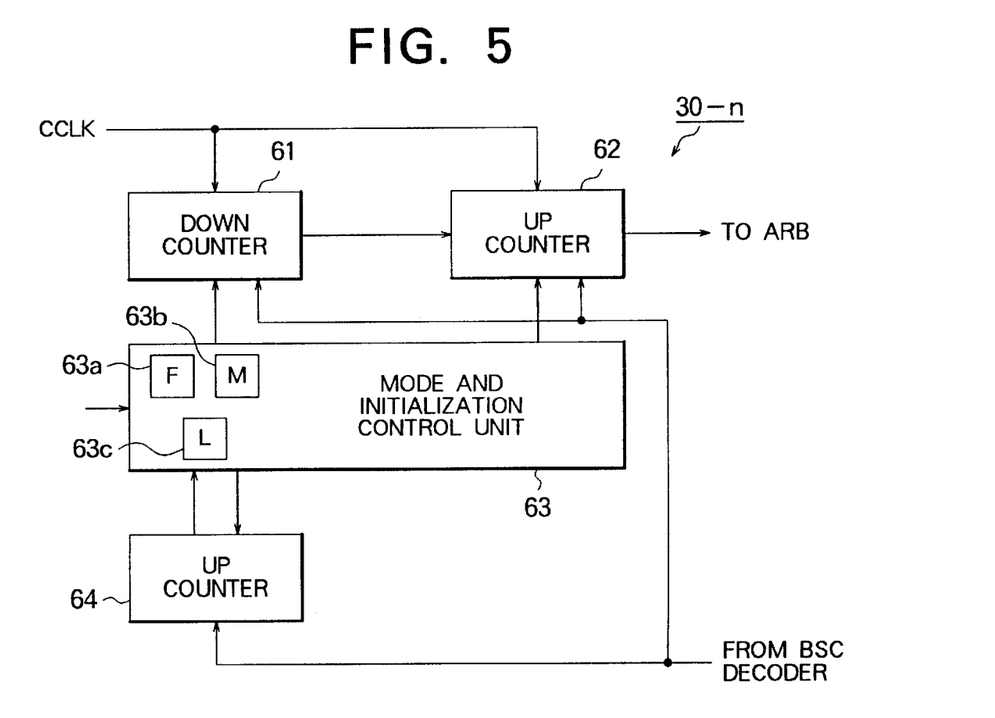
FIG. 5 is a block diagram of one of the burst schedulers in FIG. 2.

Referring to FIG. 5, each of the burst schedulers 30-n ($1 \leq n \leq N$) comprises a down-counter 61, a waiting time up-counter 62, a mode and initialization control unit 63, and a burst length up-counter 64.

When the down-counter 61 in burst scheduler 30-n receives a signal from the BSC decoder 12, indicating that the arbiter 11 has output BSC information permitting the corresponding optical network unit 1-n to transmit a burst cell, the down-counter 61 loads a value output from the mode and initialization control unit 63, counts down from that value to zero in synchronization with the cell clock CCLK, then stops counting and continues to output a zero value until the next signal from the BSC decoder 12.

When the up-counter 62 in burst scheduler 30-n receives the same signal from the BSC decoder 12, the up-counter 62 loads another value output from the mode and initialization control unit 63, and counts up from this value, in synchronization with the cell clock CCLK, while the output of the down-counter 61 is zero. The count value output by the up-counter 62 is the waiting-time signal sent to the arbiter 11.

Up-counter 64 counts up in synchronization with the signal from the BSC decoder 12, thus incrementing once each time the arbiter 11 outputs BSC information permitting optical network unit 1-n to transmit a burst cell. Up-counter 64 accordingly counts time slots assigned to optical network unit 1-n for transmission from its burst queue 44. The mode and initialization control unit 63 monitors the count value output by up-counter 64, and resets up-counter 64 to zero at certain times, as described below.

The mode and initialization control unit 63 has internal registers 63a, 63b, and 63c storing a mode flag F, a burst monitoring interval value M, and a burst length value L, respectively. The mode and initialization control unit 63 also receives signals from the upstream cell classifier 13 indicating the reception of burst cells and idle cells from the corresponding optical network unit 1-n.

The mode flag F has a first value selecting a monitoring mode, in which the mode and initialization control unit 63 checks for the presence of ATM cells in the burst queue 44 of optical network unit 1-n, and a second value selecting a burst mode, in which the mode and initialization control unit 63 assumes that ATM cells are present in the burst queue 44. When the mode flag F indicates the monitoring mode, if the upstream cell classifier 13 signals that a burst cell has been received from optical network unit 1-n, the mode flag is changed to select the burst mode. When the mode flag F indicates the burst mode, if the upstream cell classifier 13 signals that an idle cell has been received from optical network unit 1-n, the mode flag is changed to select the monitoring mode.

In the monitoring mode, when the burst scheduler 30-n is signaled by the BSC decoder 12, the mode and initialization control unit 63 loads the burst monitoring interval value M into the down-counter 61, and loads a value of zero into the up-counter 62.

When a transition from the monitoring mode to the burst mode occurs, the mode and initialization control unit 63 resets the up-counter 64 to zero, loads a value of zero into the down-counter 61, and loads a value of one into the up-counter 62. Output of these values of zero to the down-counter 61 and one to the up-counter 62 continues in the burst mode, except that the mode and initialization control unit 63 compares the count value received from up-counter 64 with the burst length value L, and takes special action when up-counter 64 increments to a value one less than the burst length value L. The special action consists of loading the burst monitoring interval value M into the down-counter 61, and resetting both up-counters 62 and 64 to zero.

Next, the operation of this embodiment will be described.

During operation, the optical subscriber unit 2A sends a steady stream of downstream cells through the star coupler 3 to the optical network units 1-1 to 1-N. Each downstream cell has a pair of identical BSC bytes output by the arbiter 11 in the bandwidth management circuit, in response to requests from the CBR schedulers 20-1 to 20-N and burst schedulers 30-1 to 30-N. When there are no requests, the arbiter 11 outputs the BSC value inhibiting all optical network units 1-1 to 1-N from transmitting cells. At other times, the BSC value designates one of the optical network units 1-1 to 1-N, and designates either a CBR cell or a burst cell.

If the designated optical network unit 1-n has a cell of the designated type queued in the CBR queue 43 or burst queue 44, the cell is sent upstream to the subscriber line terminal 2 in a time slot delayed by a predetermined amount from the downstream time slot in which the designation was received. Otherwise, an idle cell is sent in the upstream time slot.

The delay between the downstream time slot in which an optical network unit receives permission to transmit and the upstream time slot in which the transmission takes place is substantially the same for all optical network units 1-1 to 1-N. Each upstream time slot is therefore assigned to at most one optical network unit, and collisions between upstream cells from different optical network units are avoided.

In the bandwidth management circuit in the optical subscriber unit 2A, each CBR scheduler 20-n outputs requests (non-zero waiting-time values) at intervals not exceeding the cell spacing value set in the internal register 53a in the initialization controller 53. If the arbiter 11 responds promptly to each request, the requested BSC bytes will be output at intervals substantially equal to the cell spacing value. If output of a requested BSC byte is delayed, then the value loaded into down-counter 51 will be reduced accordingly, and the interval until the next request will be shortened. If output of the requested BSC bytes becomes severely delayed, causing the value zero to be loaded into the down-counter 51, then the next request will be made immediately, and the waiting-time value of the request will be increased, so that the request is treated with higher priority. This scheme keeps CBR traffic moving at a rate adequate to satisfy the CBR service contracts with each of the optical network units 1-1 to 1-N.

The behavior of a burst scheduler 30-n depends on whether the mode flag F is set to the monitoring mode or burst mode. In the monitoring mode, which is entered when optical network unit 1-n transmits an idle burst cell from its burst queue 44, down-counter 61 is loaded with the burst monitoring interval value M, and up-counter 62 is loaded with a value of zero. Burst scheduler 30-n therefore issues burst requests one by one, separated by intervals not shorter than the burst monitoring interval value M, and the arbiter 11 outputs the requested BSC bytes at intervals equal to or greater than this value M. As long as the burst queue 44 in optical network unit 1-n remains empty, the arbiter 11 continues to output these BSC bytes at these intervals, and optical network unit 1-n continues to reply by transmitting idle cells.

When ATM cells are placed in the burst queue 44 of optical network unit 1-n, the next time optical network unit 1-n receives permission to transmit a burst cell, it takes an ATM cell from the burst queue 44 and transmits that cell. Reception of this non-idle cell by the optical subscriber unit 2A causes burst scheduler 30-n to switch from the monitoring mode to the burst mode.

In the burst mode, the mode and initialization control unit 63 normally outputs values of zero to down-counter 61 and up-counter 64, and a value of one to up-counter 62. The count value output by down-counter 61 therefore remains fixed at zero. Up-counter 62 outputs an initial waiting-time value of one, requesting immediate output of a BSC designating a burst cell from optical network unit 1-n, and increments this waiting-time value at every CCLK cycle until signaled by the BSC decoder 12 that the arbiter 11 has output the requested BSC. As soon as the BSC decoder 12 signals output of this BSC, the up-counter 62 reloads the value one and immediately starts sending the arbiter 11 a request for another BSC.

The arbiter 11 thus receives a consecutive series of burst request signals from the burst scheduler 30-n, each request starting with a minimum-priority waiting-time value of one, but becoming increasingly urgent until fulfilled.

Each time the arbiter 11 fulfills one of these requests, up-counter 64 increments by one. When up-counter 64 reaches a value of L−1, up-counters 62 and 64 are reset to zero, ending the consecutive series of requests, and the burst monitoring interval value M is loaded into down-counter 61. For the next M time slots, the burst scheduler 30-n issues no burst requests. After M time slots, down-counter 61 has reached zero, so up-counter 62 increments from zero to one, and another consecutive series of burst requests begins.

Figure 6:
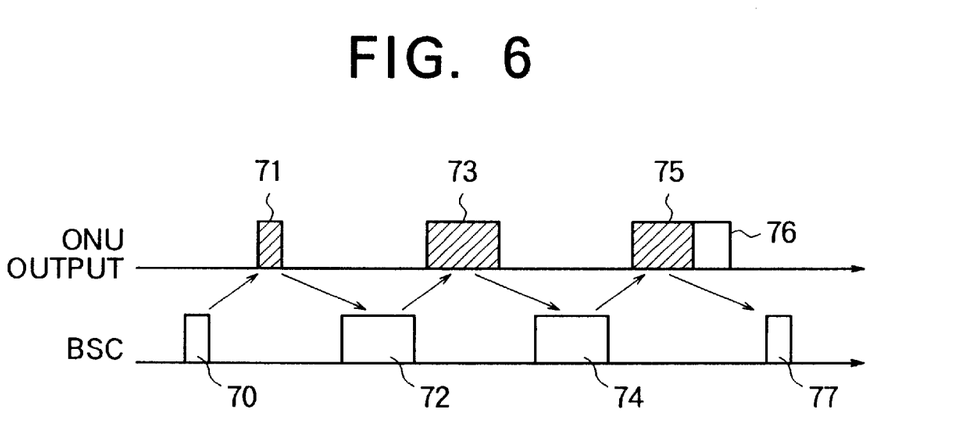
FIG. 6 is a timing diagram illustrating the operation of the bandwidth management circuit.

FIG. 6 schematically shows an example of the transmission of burst cells, starting from the monitoring mode. In this mode, the burst scheduler 30-n issues burst requests at intervals of at least M time slots, to test the status of the burst queue 44 in optical network unit 1-n. If the BSC 70 output in response to one of these requests elicits a burst cell 71 from optical network unit 1-n, the burst scheduler 30-n switches into the burst mode, and generates a series of L consecutive burst requests. The arbiter 11 responds with a corresponding series of BSCs 72, permitting optical network unit 1-n to send a burst of L cells 73.

The BSCs 72 are shown as consecutive in FIG. 6, as they will be if there are no competing requests from other burst schedulers 30-1 to 30-N or CBR schedulers 20-1 to 20-N. If competing requests are present, the BSCs 72 output in response to the series of L requests from the burst scheduler 30-n may not be consecutive, but they will be nearly consecutive, because the urgency of each request increases with each time slot until the request is fulfilled.

Having sent these L requests, the burst scheduler 30-n waits for an interval of M time slots, giving other upstream cell traffic a chance to flow unimpeded. The burst scheduler 30-n then generates another series of L burst requests, causing the arbiter 11 to output L more requested BSCs 74. Optical network unit 1-n responds by sending more burst cells 75 until, in this example, the burst queue 44 becomes empty. The optical network unit 1-n then sends idle cells 76, causing the burst scheduler 30-n to revert to the monitoring mode.

After the next interval of M time slots, the burst scheduler 30-n makes only a single burst request, and the arbiter 11 outputs only one BSC 77 designating a burst cell from optical network unit 1-n, to ascertain whether the burst queue 44 is still empty.

The burst length L can have a fixed value such as five or ten, or can be varied according to conditions. For example, the value of L can be obtained by dividing the number of optical network units with currently active connections into a fixed number representing the number of cells per unit time (for example, per millisecond) allocated for burst traffic from all connected optical network units. Different values of L may also be used for different optical network units.

The embodiment described above enables a single optical subscriber unit 2A to handle both CBR traffic and burst traffic efficiently, by specifying the type of cell (CBR or burst) in each BSC, by serving burst signal sources with bursts of BSCs when these sources have cells to send, and by monitoring these sources at appropriate intervals when these sources are idle.

In the embodiment, each optical network unit 1-n had both a CBR queue 43 and a burst queue 44, but there may be optical network units with only one type of queue. For these optical network units, only one type of BSC need be output. The bandwidth management circuit treats an optical network unit having only a CBR queue 43 as a single CBR signal source, and treats an optical network unit having only a burst queue as a single burst signal source.

As another variation of the preceding embodiment, when the selector 42 in an optical network unit receives a BSC giving permission to transmit a CBR cell, if the CBR queue 43 is empty, and if the burst queue 44 is not empty, the selector 42 can select the oldest ATM cell in the burst queue 44, and assemble an ATM-PDS cell from this cell. The VPI and VCI in the ATM-PDS header of the cell indicate that the cell is a burst cell, instead of the expected CBR cell.

Figure 7:
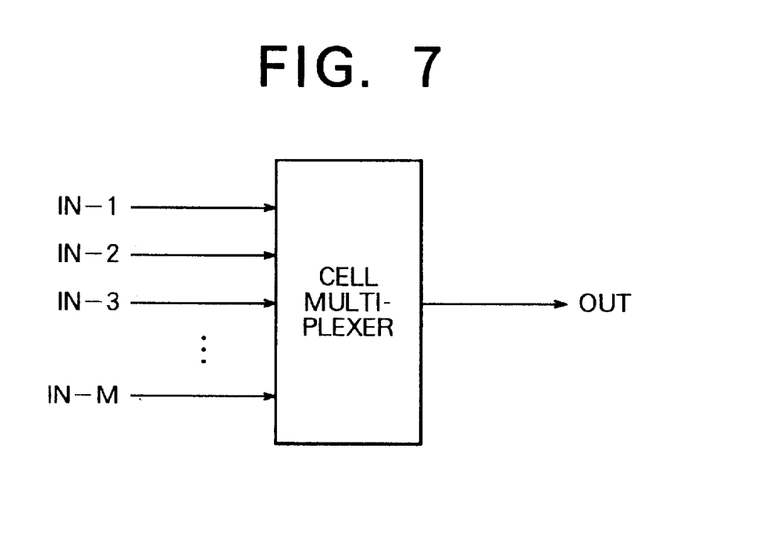
FIG. 7 is a block diagram illustrating a cell multiplexer in which the invented bandwidth management circuit can be employed.

The invented bandwidth management circuit is not restricted to use in a subscriber line terminal of an ATM-PDS system. The invented bandwidth management circuit can also be used, for example, in a cell multiplexer of the type shown in FIG. 7, that multiplexes incoming cell traffic on M input lines IN-1 to IN-M for transmission on a single output line OUT, when the incoming traffic includes both CBR traffic and burst traffic. This type of cell multiplexer generally schedules cells for output on the basis of their arrival times, but it is also possible to assign outgoing time slots without checking cell arrivals, in which case the invented bandwidth management circuit can be usefully employed.

Those skilled in the art will recognize that further variations are possible within the scope claimed below.

What is claimed is:

1. A method of assigning time slots to a plurality of signal sources sharing a common communication channel, the signal sources including at least one constant-bit-rate signal source and at least one burst signal source, comprising the steps of:

generating first request signals, each first request signal requesting one time slot for a corresponding constant-bit-rate signal source, the first request signals for each said constant-bit-rate signal source being generated at intervals determined according to a service parameter of said constant-bit-rate signal source;

generating second request signals in a burst mode, each second request signal requesting one time slot for a corresponding burst signal source, the second request signals for each burst signal source being generated in a consecutive series of a certain number of second request signals, followed by a certain interval before another consecutive series of second request signals is generated for said burst signal source; and assigning each time slot on said shared communication channel to one of said signal sources according to said first request signals and said second request signals.

2. The method of claim 1, wherein priority is given to said first request signals, when said first request signals compete with said second request signals.

3. The method of claim 1, further comprising the steps of:

generating said second request signals in a monitoring mode, in which the second request signals for each said burst signal source are generated one by one at certain intervals;

switching to said monitoring mode, for one said burst signal source, when said burst signal source has no information to send in a time slot assigned in response to a second request signal generated in said burst mode; and switching to said burst mode, for one said burst signal source, when said burst source sends information in a time slot assigned in response to a second request signal generated in said monitoring mode.

4. The method of claim 3, wherein the intervals between the second request signals generated in said monitoring mode are equal to the intervals between different series of second request signals generated in said burst mode.

5. The method of claim 1, wherein each said second request signal has a priority, which is used to resolve conflicts between competing second request signals, further comprising the further step of:

increasing the priority of each said second request signal until the time slot requested by said second request signal is assigned.

6. The method of claim 5, wherein the priority of each said second request signal is initially a minimum priority.

7. A bandwidth management circuit for assigning time slots on a communication channel to a plurality of signal sources sharing said communication channel, the signal sources including at least one constant-bit-rate signal source and at least one burst signal source, the bandwidth management circuit comprising:

at least one constant-bit-rate scheduler generating first request signals requesting time slots for a corresponding constant-bit-rate signal source, at intervals determined according to a service parameter of said constant-bit-rate signal source, a separate constant-bit-rate scheduler being provided for each said constant-bit-rate signal source;

at least one burst scheduler generating second request signals in a burst mode, consecutively requesting a predetermined number of time slots for a corresponding burst signal source, a separate burst scheduler being provided for each said burst signal source;

an arbiter coupled to said constant-bit-rate scheduler and said burst scheduler, for assigning each time slot on said communication channel to one of said signal sources, according to said first request signals and said second request signals; and a decoder coupled to said arbiter, for notifying each said constant-bit-rate scheduler when a time slot is assigned to the corresponding constant-bit-rate signal source, and notifying each said burst scheduler when a time slot is assigned to the corresponding burst signal source.

8. The bandwidth management circuit of claim 7, wherein said arbiter gives priority to said first request signals, when said first request signals compete with said second request signals.

9. The bandwidth management circuit of claim 7, wherein said burst scheduler also generates said second request signals in a monitoring mode, in which second request signals are generated one by one at certain intervals, said burst scheduler switching to said monitoring mode when the corresponding burst signal source has no information to transmit in a time slot assigned in response to a second request signal generated in said burst mode, and switching to said burst mode when said corresponding burst signal transmits information in a time slot assigned in response to a second request signal generated in said monitoring mode.

10. The bandwidth management circuit of claim 9, wherein the intervals between the second request signals generated in said monitoring mode are equal to the intervals between series of second request signals generated in said burst mode.

11. The bandwidth management circuit of claim 7, wherein:

each said second request signal has a priority;

said arbiter uses the priority of said second request signals to resolve conflicts between competing second request signals; and said burst scheduler increases the priority of each said second request signal until the time slot requested by said second request signal is assigned.

12. The bandwidth management circuit of claim 11, wherein the priority of each said second request signal is initially a minimum priority.

13. The bandwidth management circuit of claim 7, wherein said burst scheduler comprises:

a first counter for determining lengths of intervals between said second request signals by counting said time slots, said second request signals being generated after said first counter reaches a first value, said first counter being initialized when said decoder indicates that a time slot has been assigned to the corresponding burst signal source; and a second counter for counting time slots assigned to said corresponding burst signal source, said first counter being initialized to different values depending on a count value output by said second counter.

14. The bandwidth management circuit of claim 13, further comprising a third counter generating a priority value by counting time slots, said priority value being used to resolve conflicts between competing second request signals, said third counter being initialized when said decoder indicates that a time slot has been assigned to the corresponding burst signal source, and starting to count when said first counter reaches said first value.

15. A communication apparatus comprising the bandwidth management circuit of claim 7, communicating with said signal sources through said communication channel, transmitting to said signal sources information indicating the signal source to which each said time slot is assigned, and receiving information transmitted by the signal sources in the assigned time slots.

16. The communication apparatus of claim 15, wherein said communication apparatus is used as an optical subscriber unit in an optical communication system.

17. A communication system comprising:

the communication apparatus of claim 15;

a star coupler coupled to said communication apparatus by said communication channel; and a plurality of network units independently coupled to said star coupler, each network unit having at least one of two types of queue for storing information to be transmitted to said communication apparatus, said two types of queue being a constant-bit-rate queue and a burst queue, a network unit having a constant-bit-rate queue being treated as a constant-bit-rate signal source, a network unit having a burst queue being treated as a burst signal source, and a network unit having both a constant-bit-rate queue and a burst queue source being treated as both a constant-bit-rate signal source and a burst signal source.

18. The communication system of claim 17, wherein said communication apparatus transmits to said network units, for each time slot, information designating one of said two types of queue and at most one of said network units, the designated network unit being permitted to transmit information from the designated type of queue in said time slot.

19. The communication system of claim 17, wherein said communication apparatus communicates with said network units in an asynchronous transfer mode.

20. A dual-queue network unit coupled to a communication apparatus by a communication channel having time slots shared by a plurality of network units, said dual-queue network unit being one of said plurality of network units, comprising:

a constant-bit-rate queue for storing information to be transmitted to said communication apparatus at a substantially constant bit rate;

a burst queue for storing information to be transmitted to said communication apparatus in variable bursts;

a detector for receiving from said communication apparatus, for each time slot, information designating at most one network unit among said plurality of network units, and designating one type of queue among said constant-bit-rate queue and said burst queue; and a selector coupled to said constant-bit-rate queue, said burst queue, and said detector, for selecting information from one queue among said constant-bit-rate queue and said burst queue, as designated by the information received by said detector, when the information received by said detector information also designates said dual-queue network unit, and transmitting the information thus selected to said communication apparatus.

21. The network unit of claim 20, wherein said dual-queue network unit is an optical network unit.

* * * * *